(12) United States Patent
Broeder et al.

(10) Patent No.: US 11,023,434 B2
(45) Date of Patent: Jun. 1, 2021

(54) NO ROLLBACK THRESHOLD FOR AUDIT TRAIL

(71) Applicant: HEWLETT PACKARD ENTERPRISE DEVELOPMENT LP, Houston, TX (US)

(72) Inventors: Sean L. Broeder, Sunnyvale, CA (US); Gary Stephen Smith, Roseville, CA (US); Shang-Sheng Tung, Cupertino, CA (US); John Stewart de Roo, Wellington (NZ)

(73) Assignee: Hewlett Packard Enterprise Development LP, Houston, TX (US)

( * ) Notice: Subject to any disclaimer, the term of this patent is extended or adjusted under 35 U.S.C. 154(b) by 735 days.

(21) Appl. No.: 15/021,563

(22) PCT Filed: Sep. 30, 2013

(86) PCT No.: PCT/US2013/062557
§ 371 (c)(1),
(2) Date: Mar. 11, 2016

(87) PCT Pub. No.: WO2015/047373
PCT Pub. Date: Apr. 2, 2015

(65) Prior Publication Data
US 2016/0232185 A1  Aug. 11, 2016

(51) Int. Cl.
*G06F 16/21* (2019.01)
*G06F 16/23* (2019.01)
(Continued)

(52) U.S. Cl.
CPC .......... *G06F 16/219* (2019.01); *G06F 9/467* (2013.01); *G06F 16/21* (2019.01);
(Continued)

(58) Field of Classification Search
CPC .......... G06F 16/219; G06F 16/21; G06F 9/467
See application file for complete search history.

(56) References Cited

U.S. PATENT DOCUMENTS 5,561,795 A    10/1996  Sarkar
5,590,274 A *  12/1996  Skarpelos ........... G06F 11/1474
                                              714/6.32
(Continued)

FOREIGN PATENT DOCUMENTS

KR    10-2006-0122677 A    11/2006

OTHER PUBLICATIONS

Hewlett-Packard Company, "HP Neoview SQL Reference Manual," (Research Paper), Aug. 2007, 462 pages.
(Continued)

*Primary Examiner* — Eliyah S. Harper
(74) *Attorney, Agent, or Firm* — Hewlett Packard Enterprise Patent Department

(57) ABSTRACT

Examples of a no rollback threshold for an audit trail are disclosed. In one example implementation according to aspects of the present disclosure, a method may include processing, by a computing system, a database transaction, and determining, by the computing system, whether a transaction span of the transaction exceeds a no rollback threshold for an audit trail. The method may include, in response to determining that the transaction span exceeds the no rollback threshold, converting, by the computing system, the transaction into a no rollback transaction. Additionally, the method may include, in response to determining that the transaction span exceeds the no rollback threshold, abandoning, by the computing system, the transaction if an error is encountered during the processing the transaction.

20 Claims, 4 Drawing Sheets

(51) Int. Cl.
  *G06F 9/46* (2006.01)
  *G06F 11/14* (2006.01)
(52) U.S. Cl.
  CPC ...... *G06F 16/2365* (2019.01); *G06F 11/1471* (2013.01); *G06F 11/1474* (2013.01); *G06F 2201/81* (2013.01)

(56) References Cited

U.S. PATENT DOCUMENTS

| | | | |
|---|---|---|---|
| 6,192,365 B1 | 2/2001 | Draper et al. | |
| 6,662,307 B1 * | 12/2003 | Sipple | G06F 11/1458 714/2 |
| 6,728,747 B1 | 4/2004 | Jenkins et al. | |
| 6,814,414 B1 * | 11/2004 | Schmitt | B60T 7/122 303/191 |
| 8,332,349 B1 | 12/2012 | Wilson | |
| 9,697,226 B1 * | 7/2017 | Youngworth | G06F 3/0607 |
| 2002/0007363 A1 * | 1/2002 | Vaitzblit | G06F 11/1471 |
| 2004/0102182 A1 * | 5/2004 | Reith | H04M 17/10 455/410 |
| 2005/0055606 A1 * | 3/2005 | Kutan | G06F 11/2028 714/15 |
| 2006/0190702 A1 * | 8/2006 | Harter | G06F 11/10 712/15 |
| 2007/0101192 A1 * | 5/2007 | Kutan | G06F 11/1402 714/16 |
| 2011/0029490 A1 * | 2/2011 | Agarwal | G06F 9/467 707/684 |
| 2011/0099436 A1 | 4/2011 | Freund et al. | |
| 2011/0321011 A1 * | 12/2011 | Selitser | H04L 67/02 717/120 |
| 2013/0139230 A1 * | 5/2013 | Koh | G06Q 20/352 726/5 |

OTHER PUBLICATIONS

IBM, "Configuration Parameters for Database Logging," (Web Page), 2007, 9 pages.
International Search Report & Written Opinion received in PCT Application No. PCT/US2013/062557, dated Jun. 26, 2014, 11 pages.

* cited by examiner

NO ROLLBACK THRESHOLD FOR AUDIT TRAIL

BACKGROUND

Databases residing on computing systems have grown in importance, size, and complexity as users continually increase the amount of data generated and needed. For example, databases may span across multiple servers, may contain millions of records, and dozens of gigabytes of data. As a result, database management has also become increasingly important and complicated.

BRIEF DESCRIPTION OF THE DRAWINGS

The following detailed description references the drawings, in which.

DETAILED DESCRIPTION

Figure 1:
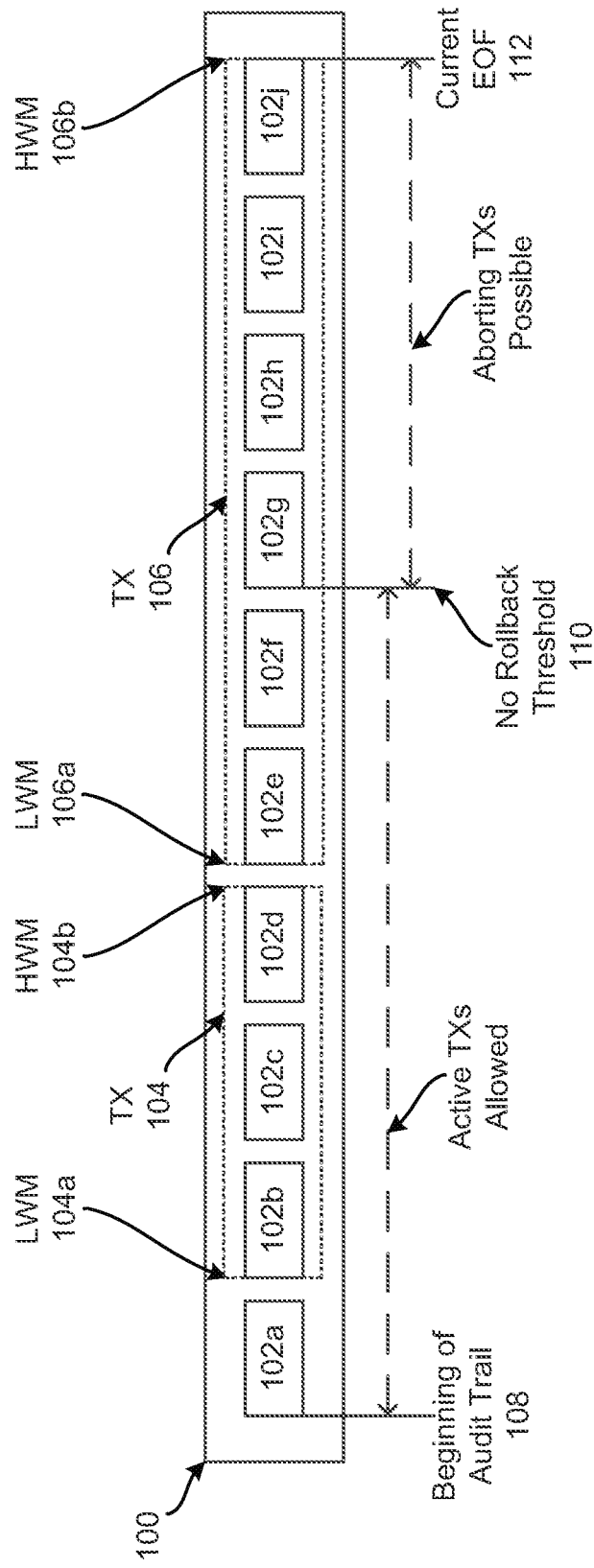
FIG. 1 illustrates a block diagram of an audit trail utilizing a no rollback threshold according to examples of the present disclosure.

Database administrators may wish to monitor and record database transactions as they relate to modifying the database. For example, monitoring and recording (also known as auditing) can be based on individual actions, such as the type of SQL statement executed, and/or on combinations of factors such as the user performing the action, and application, a time, etc. Auditing may monitor and gather data about database activities such as statistics about which tables are being updated, which users are modifying the database content, etc.

In a traditional database, these transactions are logged into audit trails so that the transactions may be replayed or undone, such as in the event of an error or for recovery purposes. These audit trails (or audit logs) are sometimes implemented as circular buffers that are reused once all previous buffers are filled and the next buffer is no longer needed for prior transaction activity storage. Within these buffers, a transaction has a beginning and an end, and the audit trail records for a transaction are described within this range. Sometimes this range is described as existing between a low water mark (LWM) and a high water mark (HWM), characterized as the position of the first audit trail record for a transaction and the last audit trail record for the same transaction, respectively. The HWM may also be the final state record (commit or abort) for a transaction.

Within this range or span of audit trail records, there may be records for only the specified transaction, or more likely, there may be other intermingled audit records for other distinct transactions. The LWM for a transaction typically serves to identify or mark audit buffers that cannot be reused for new transactions as long as the transaction to which it belongs remains unresolved. That is, the particular LWM cannot be reused for new transactions until it either commits or aborts and becomes a permanent part of the database.

Databases are tending to increase in size, and the workloads run against those growing databases are gaining in complexity. Consequently, an audit trail span of a transaction (the range between the LWM and the HWM) also grows larger. In so called "big data" implementations, it is quite likely that single queries or transformations could easily exceed the entire capacity of the allocated audit trail space or that the cost of maintaining adequate audit trail space is prohibitive. Without also increasing the capacity of the audit trail, the risk arises of exhausting the audit trail space before the transaction completes. Previously, a variety of strategies have been implemented to attempt to accommodate the space requirements of an increasing large audit trail. For example, adding more audit capacity or moving older audit trails off platform to free local disk space have been contemplated. However, these solutions increase cost by adding disk space or moving the logs to another dedicated storage location, while also increasing the cost of additional server space.

Moreover, database systems are optimized for the most common situation, which is that a transaction commits. When a transaction enters a rollback state, it is often much less efficient at generating and processing the compensating records to roll back the database to a consistent or known state. If a transaction produces many audit records and is active for a few minutes (e.g., fifteen minutes) before it aborts, it would not be unusual for the transaction rollback to take several hours, during which time the underlying SQL table may be locked, which would prevent additional operations from occurring.

Various embodiments will be described below by referring to several examples of a no rollback threshold for an audit trail. The no rollback threshold allows a database administrator (DBA) to specify the range of audit a transaction is allowed to span before that transaction's personality is altered such that rollback will no longer be attempted. The transaction will not be aborted, and it will continue as if nothing has changed. However, if for some reason the transaction should abort, as the result of an operational or hardware error or at a user's request, the transaction will not rollback and instead be abandoned.

In some implementations, the no rollback threshold may prevent extended outage or lock-down periods during a rollback period. If a database is empty and being populated, it may be desirable to restart the load by returning to an empty database rather than to attempt to wait a prolonged period of time for transaction rollback to occur. Moreover, there is no need to archive older audit trails off platform as they will never be needed. This eliminates the cost of off platform storage and the time needed to restore and read the logs. There may also not be a need to block new transactions because of large transactions spanning too much space in the audit trails because such transactions are automatically converted to no rollback. This allows other work in the system to proceed normally. Protracted recovery times and gross table locks from huge table load failures are eliminated because such transactions are abandoned. The tables can be dropped and recreated in seconds and normal operations can continue. These and other advantages will be apparent from the description that follows.

FIG. 1 illustrates a block diagram of an audit trail 100 having a no rollback threshold according to examples of the present disclosure.

One implementation of the no rollback threshold exposes a configurable audit trail capacity parameter known as a no rollback threshold, which when exceeded by a transaction, causes the transaction to be converted to a no rollback state.

Transactions exceeding this threshold are abandoned rather than aborted (rollback) if an error occurs. For example, FIG. 1 illustrates an audit trail 100 that consists of ten files 102a-j. Each file may have a defined capacity (in one example, 100 MB capacity per file). In total, the audit trail 100 includes space for all ten files 102a-j (in this example, 1,000 MB total capacity for the audit trail 100).

A user or DBA may establish a no rollback threshold that, if exceeded by any transaction that spans more than the threshold, would be converted to a no rollback state. Transactions converted to the no rollback state (also known as no rollback transactions) are not rolled back in the event of an error occurring during the processing of the transaction. In this example, the no rollback threshold is set to a capacity threshold of 40%, and the audit trail has 1,000 MB of available storage space. Transactions, such as TX 104, which are smaller than the available space in the audit trail 100 are allowed to be stored in the audit trail. More specifically, in this example, TX 104 spans 300 MB, as it occupies three 100 MB files 102b-d. When TX 104 begins, at file 102b, only 100 MB of space was used in the audit trail (that is, only file 102a, being 100 MB, was used). This means that the available capacity in audit trail 100 was 900 MB or 90% which is greater than the no rollback threshold 110 set at 40%. Because the available capacity in the audit trail 100 is greater than the no rollback threshold 110, the audit trail was able to store TX 104.

TX 106 (a transaction spanning 600 MB), however, cannot be stored in audit trail 100 because the span of TX 106 exceeds the no rollback threshold 110. In other words, the available capacity in the audit trail 100 is less than the no rollback threshold 110. More specifically, TX 106 began a file 102e, meaning that 400 MB of capacity was already used in audit trail 100. Because TX 106 exceeds the no rollback threshold 110, TX 106 may be stored in the audit trail 100; however, not all files relating to TX 106 may be kept until the transaction completes because the early records will not be needed for transaction rollback.

It should be understood that the same determination can be made by observing the low water mark for each transaction. For example, LWM 104a represents the low water mark for TX 104 while LWM 106a represents the low water mark for TX 106. Similarly, HWM 104b represents the high water mark for TX 104 while HWM 106b represents the high water mark for TX 106. The audit trail 100 is defined as the space between the beginning of audit trail 108 and the current EOF 112, which is the current end of file position.

In the example shown in FIG. 1, the current end of file (EOF) 112 also represents the HWM for the active transactions (such as TX 106). In this case, HWM 106b corresponds to current EOF 112, and calculating the no rollback threshold position from the EOF 112 provides the lowest LWM allowed before a transaction is converted to no rollback. In this case, a 40% no rollback threshold is shown at file 102g. If an active transaction, such as TX 106, has a LWM in files 102a-f, the transaction will be converted to a no rollback transaction. In the present example, TX 106 has a LWM in that range (LMW 106a is in file 102e), and thus would be converted to a no rollback transaction.

For TX 104, it should be understood that the transaction has completed because its HWM is in file 102d, not at the current EOF 112. However, when the HWM 104b for TX 104 was at the current EOF 112, the LWM 104a for TX104 would have been in file 102h, less than the no rollback threshold 110. In this case, TX 104 would not be converted to a no rollback threshold. Once completed, TX 104 (or other completed transactions) would not be considered when determining which transactions (if any) should be converted to no rollback transactions.

It should be understood that the no rollback threshold can be deactivated or turned off by a database administrator by specifying that a no rollback threshold of 100%. In such a configuration, a transaction would not exceed the no rollback threshold and therefore would not be converted to a no rollback transaction. In this example, the transaction may be aborted if it exceeds the audit trail capacity. In this way, the system may never run out of audit trail space.

Figure 2A:
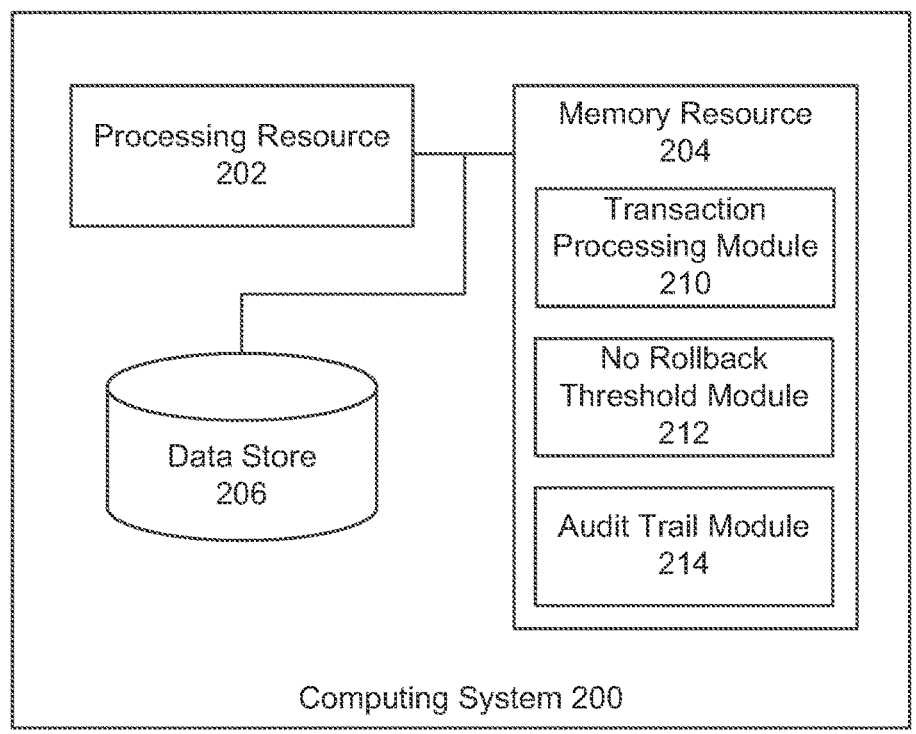
FIGS. 2A-B illustrate a block diagrams of computing systems for a no rollback threshold for an audit trail according to examples of the present disclosure.

FIG. 2A illustrates a block diagram of a computing system 200 for a no rollback threshold for an audit trail according to examples of the present disclosure. It should be understood that the computing system 200 may include any appropriate type of computing device or combination of computing devices, including for example smartphones, tablets, desktops, laptops, workstations, servers, smart monitors, smart televisions, digital signage, scientific instruments, retail point of sale devices, video walls, imaging devices, peripherals, or the like. The computing system 200 may be a single computing device or may be a collection of computing devices such that the processes and programming described herein may be performed by a single computing device or may be distributed across a collection of computing devices.

The computing system 200 may include a processing resource 202 that may be configured to process instructions. The instructions may be stored on a non-transitory tangible computer-readable storage medium, such as memory resource 204, or on a separate device (not shown), or on any other type of volatile or non-volatile memory that stores instructions to cause a programmable processor to perform the techniques described herein. Alternatively or additionally, the computing system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

The computing system may also include a data store 206, which may be one or more electronic or mechanical data storage devices, such as hard disk drives, solid state drives, magnetic memory devices, and the like. The data store 206 may be contained on a single computing device or distributed across a collection of computing devices. The data store 206 may include one or more databases, for which the computing system 200 processes transactions. The data store 206 may also store an audit trail having records of transactions performed for on or the database(s).

In addition to the processing resource 202, the memory resource 204, and the data store 206, the computing system 200 may include an audit transaction processing module 210, a no rollback threshold module 212, and an audit trail module 214. In one example, the modules described herein may be a combination of hardware and programming. The programming may be processor executable instructions stored on a tangible memory resource such as memory resource 204, and the hardware may include processing resource 202 for executing those instructions. Thus memory resource 204 can be said to store program instructions that when executed by the processing resource 202 implement the modules described herein. Other modules may also be utilized as will be discussed further below in other examples.

The transaction processing module 210 processes transactions on or for a database, such as a database stored in data store 206. The database may be any appropriate type of database and maybe access, for example, through a database management system. A user may enter a transaction to be executed or may select a transaction to be executed through the database management system. The transaction (or transactions) is processed by the audit transaction processing module 210 of the computing system 200.

The no rollback threshold module 212 defines a no rollback threshold which is a configurable audit log capacity parameter that when exceeded by a transaction span causes the transaction to be converted to a no rollback state or a no rollback transaction. Transactions exceeding this threshold are abandoned rather than aborted (rolled back) if an error occurs during the transaction processing by the transaction processing module 210.

The audit trail module 214 monitors each transaction processed by the transaction processing module 210, and compares the span of the transaction against the audit trail to determine the current audit trail span of the transaction. The audit trail module 214 also compares the span of the transaction against the no rollback threshold to determine if the transaction has exceeded the no rollback threshold and whether it should be converted to a no rollback state based on the no rollback threshold. When it is determined that the transaction should be converted to a no rollback transaction, the audit trail module 214 communicates this fact to the transaction processing module 210.

In one example, such as shown in FIG. 1, the no rollback threshold may be set to a threshold capacity of 40% in the no rollback threshold module 212. In this example, any transaction that spans more than 40% of the total audit trail is converted to a no rollback state by the audit trail module 214. If an error occurs or is encountered by the transaction processing module 210 while processing a no rollback transaction, the no rollback transaction is abandoned rather than being aborted (rolled back) when the error occurs. By abandoning large transactions exceeding the no rollback threshold, time can be saved by not attempting a lengthy rollback procedure. It may be more efficient and/or timelier to simply abandon large transactions and allow them to be re-run by a user of the database management system than to attempt to roll them back by the database management system itself. In contrast, transactions falling below the no rollback threshold will be aborted and rolled back if an error should occur, meaning the transaction will be re-attempted and not abandoned.

Figure 2B:
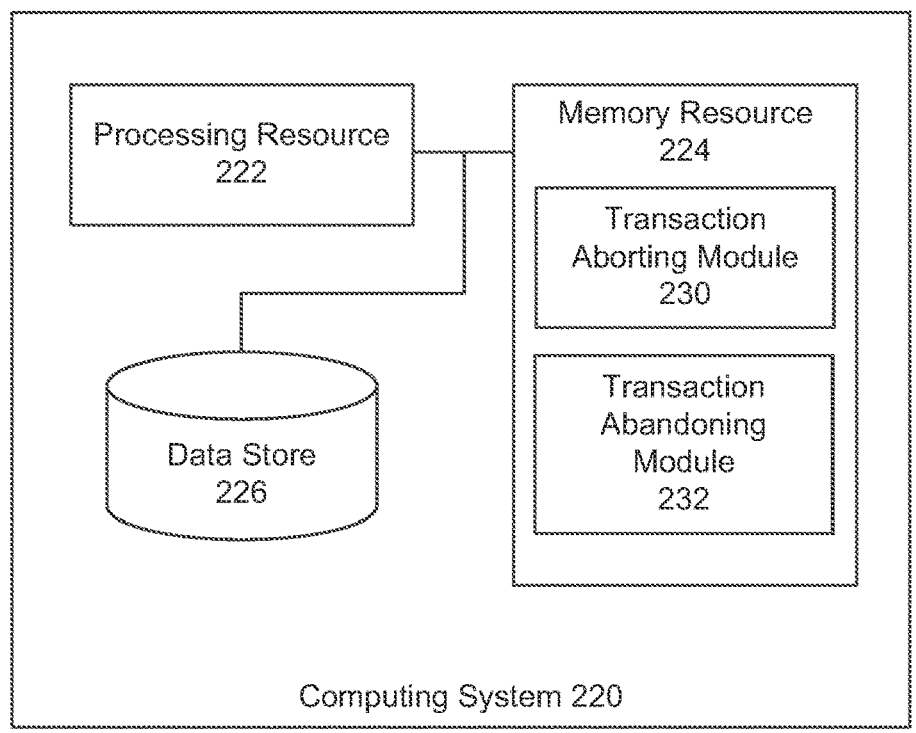

FIG. 2B illustrates a block diagram of a computing system 220 for a no rollback threshold for an audit trail according to examples of the present disclosure. Like FIG. 2A, FIG. 2B illustrates a computing system 220 having a processing resource 222, a memory resource 224, and a data store 226. Additionally, computing system 220 includes a transaction aborting module 230 and a transaction abandoning module 232.

When executed, the transaction aborting module 230 causes the computing system 220 to abort a database transaction upon the occurrence of a processing error while processing the transaction when a transaction span of the transaction does not exceed a no rollback threshold. For example, if an error occurs while processing resource 222 is processing a transaction, the transaction aborting module 230 will cause the computing system 222 to abort the database transaction if the transaction span does not exceed the no rollback threshold. In this case, the transaction may be rolled back and/or repeated after the failure or error.

When executed, the transaction abandoning module 232 causes the computing system 220 to abandon the database transaction upon the occurrence of a processing error while processing the transaction when the transaction span of the transaction exceeds a no rollback threshold. In this case, if an error occurs while processing resource 222 is processing a transaction, the transaction abandoning module 232 will cause a computing system 2222 abandon the database transaction if the transaction span exceeds the no rollback threshold. In this case, the transaction may not be rolled back and/or repeated after the failure or error.

Figure 3:
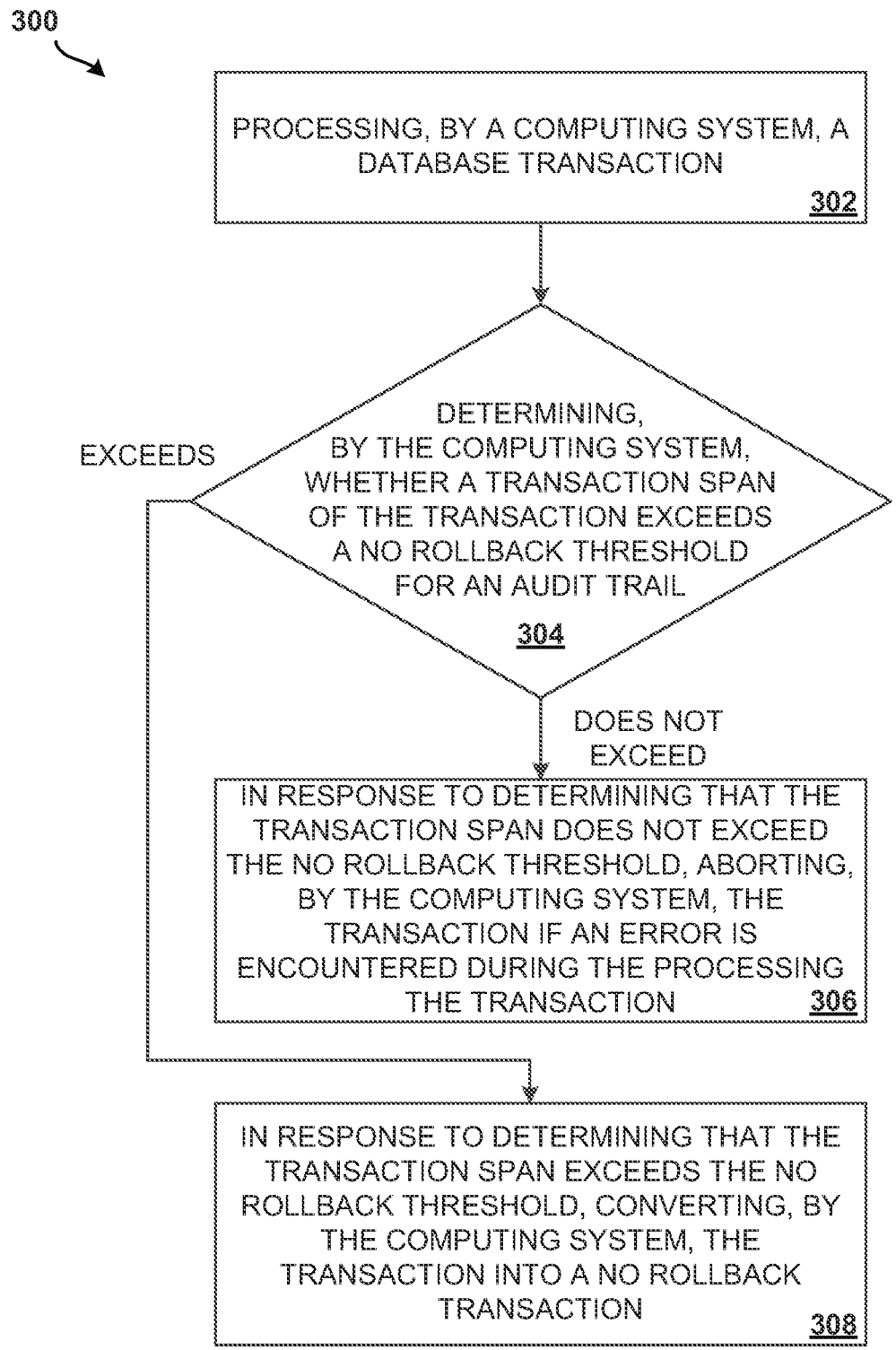
FIG. 3 illustrates a flow diagram of a method for processing no rollback transactions for an audit trail according to examples of the present disclosure.

FIG. 3 illustrates a flow diagram of a method 300 for processing no rollback transactions for an audit trail according to examples of the present disclosure. The method 300 may be performed by a computing system, such as computing systems 200 and/or 220 of FIGS. 2A-B, or by another suitable device or devices. The method 300 may include the following: processing, by a computing system, a database transaction (block 302); determining, by the computing system, whether a transaction span of the transaction exceeds a no rollback threshold (block 304); in response to determining that the transaction span does not exceed the no rollback threshold, aborting, by the computing system, the transaction if an error is encountered during the processing the transaction (block 306); and in response to determining that the transaction span exceeds the no rollback threshold, converting, by the computing system, the transaction into a no rollback transaction (block 308).

At block 302, the method 300 may include processing, by a computing system, a database transaction. In an example, a user of the computing system inputs a database transaction relating to adding or modifying data in the database. The user may utilize a database management system on or communicatively coupled to the computing system. The database transaction may be any of a variety of appropriate commands or actions relating to the database. The computing system may process the database transaction or transactions as appropriate. For example, if the database transaction indicates the data should be added to a table of the database, the computing system may cause the data to be added to the indicated table. Once the processing has begun, the method 300 may continue to block 304.

At block 304, the method 300 may include determining, by the computing system, whether a transaction span of the transaction exceeds a no rollback threshold for an audit trail. At this block, the computing system compares the no rollback threshold to the span of the transaction being processed at block 302. For example, if the no rollback threshold size is configured to be 40%, and the audit trail has 1,000 MB of available storage space, the computing system determines whether the transaction span of the transaction exceeds the remaining space in the audit trail (i.e., 400 MB). If, for example, the transaction span requires 450 MB in the audit trail, then it would be determined that the transaction span (in this case, 450 MB) has exceeded the no rollback threshold for the audit trail. In this case, the method 300 would proceed to block 308. If, however, in the same example, the transaction span used only 200 MB (or 20%) of the audit trail, then it would be determined that the transaction span has not exceeded the no rollback threshold for the audit trail. In this case, the method 300 would proceed to block 306.

In one example, the transaction span is the range between a low water mark for the transaction and a high water mark for the transaction. The method 300 may include determining whether the transaction span of the transaction exceeds a no rollback threshold may further comprise determining whether the low water mark for the transaction is less than the no rollback threshold. In other words, if the low water mark for a particular transaction is less than or lower than the no rollback threshold, then the transaction span of the transaction does not exceed the no rollback threshold for the audit trail. If however, the low water mark for the transaction is not less than the no rollback threshold, then the transaction span of the transaction exceeds the no rollback threshold for the audit trail. The method 300 may then continue to block 306 or block 308, depending upon the determination made at block 304.

At block 306, the method 300 may include in response to determining that the transaction span does not exceed the no rollback threshold, aborting, by the computing system, the transaction if an error is encountered during the processing the transaction. If it is determined that the transaction span does not exceed the no rollback threshold, then the transaction will be aborted if an error is encountered during the processing of the transaction. For example, if the data error caused by corrupt data results in an error during the processing of the database transaction, and it is determined that the transaction span exceeds the no rollback threshold, then the transaction will be aborted rather than being abandoned. In other words, the transaction will be re-attempted by the computing device if an error occurs during the processing.

At block 308, the method 300 may include in response to determining that the transaction span exceeds the no rollback threshold, converting, by the computing system, the transaction into a no rollback transaction. In this case, if it is determined that the transaction span exceeds the no rollback threshold, then the transaction is converted into a no rollback transaction. The no rollback transaction is may be stored in the audit trail as if nothing has happened. However, it is possible that not all audit trail files remain on the disk for the life of the transaction. For example, if a transaction spans all ten files of an audit trail (such as in the example illustrated in FIG. 1), the first file may be dropped to create more space at the end of file (EOF). A transaction spanning 15 files, for example, could have an audit trail from files six through fifteen on a disk, but the audit from files one through five may be lost. It may be possible in some examples to continue to audit the transaction even once it is determined that the transaction span exceeds the no rollback threshold. In other examples, the auditing may stop all together once it is determined that the transaction span exceeds the no rollback threshold.

Additionally, in response to determining that the transaction span exceeds the no rollback threshold, the computing system abandons the no rollback transaction if an error is encountered while processing the no rollback transaction. Because the no rollback transaction is not stored in the audit trail, the transaction could not be rolled back and/or reattempted based on the content of the audit trail because the no rollback transaction is not stored in the audit trail.

Additional processes also may be included, and it should be understood that the processes depicted in FIG. 3 represent illustrations, and that other processes may be added or existing processes may be removed, modified, or rearranged without departing from the scope and spirit of the present disclosure.

FIGS. 4A-D illustrate methods for determining—such as by a transaction module—whether to commit (i.e., process) or abort a transaction based on a no rollback threshold for an audit trail according to examples of the present disclosure.

Figure 4A:
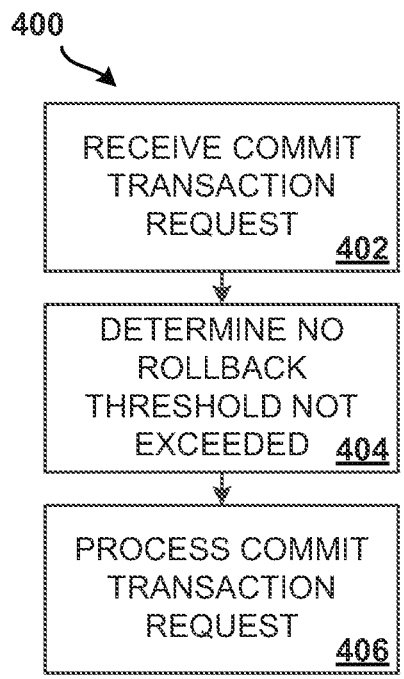
FIGS. 4A-D illustrate methods for determining whether to commit or abort a transaction based on a no rollback threshold for an audit trail according to examples of the present disclosure.

In FIG. 4A a method 400 illustrates a commit transaction request being received by a transaction module at block 402. At block 404, the transaction module determines that the no rollback threshold is not exceeded and proceeds to commit the transaction request at block 406.

Figure 4B:
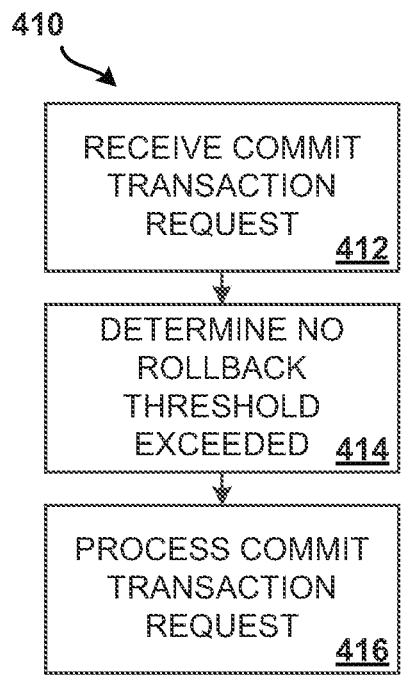

In FIG. 4B a method 410 illustrates a commit transaction request being received by a transaction module at block 412. At block 404, the transaction module determines that the no rollback threshold is exceeded and proceeds to commit the transaction request at block 416.

Figure 4C:
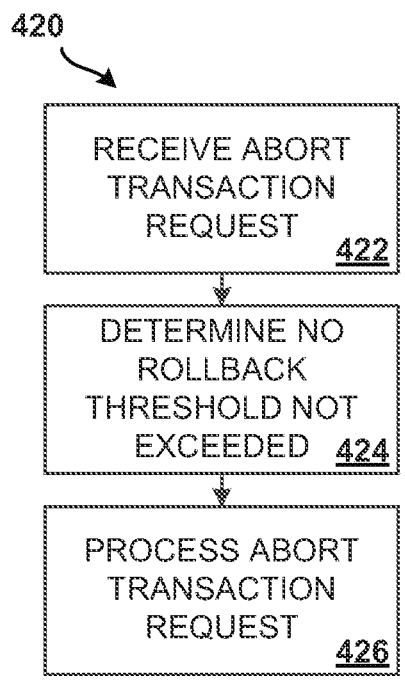

In FIG. 4C a method 420 illustrates an abort transaction request being received by a transaction module at block 422. At block 424, the transaction module determines that the no rollback threshold is not exceeded and proceeds to abort the abort request at block 426.

Figure 4D:
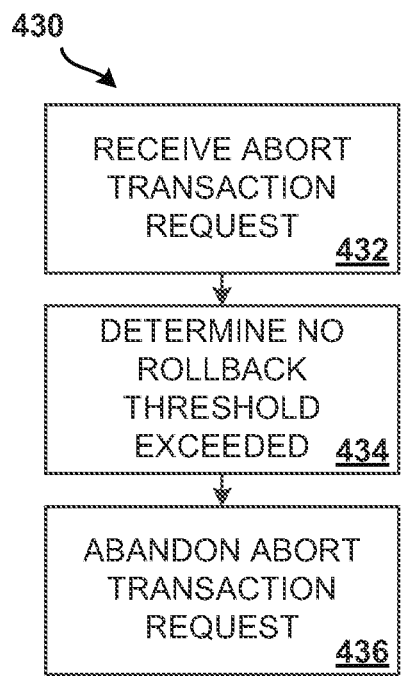

In FIG. 4D a method 430 illustrates an abort transaction request being received by a transaction module at block 422. At block 424, the transaction module determines that the no rollback threshold is exceeded and proceeds to abandon the abort request at block 426.

Additional processes also may be included, and it should be understood that the processes depicted in FIGS. 4A-D represent illustrations, and that other processes may be added or existing processes may be removed, modified, or rearranged without departing from the scope and spirit of the present disclosure.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A method comprising:
 processing, by a computing system, a database transaction;
 determining, by the computing system, whether a transaction span of the database transaction exceeds a no rollback threshold for an audit trail that stores records of database transactions, the no rollback threshold being preset to a percentage of a capacity of the audit trail; and
 in response to determining that the transaction span exceeds the no rollback threshold:
  converting, by the computing system, the database transaction into a no rollback transaction, and
  abandoning, by the computing system, the database transaction responsive to encountering an error during the processing of the database transaction.

2. The method of claim 1, further comprising:
 in response to determining that the transaction span does not exceed the no rollback threshold, aborting, by the computing system, the database transaction responsive to encountering an error during the processing of the database transaction, wherein the aborting of the database transaction comprises rolling back the database transaction to a prior state.

3. The method of claim 1, wherein the transaction span is a range between a low water mark for the database transaction and a high water mark for the database transaction, wherein the low water mark for the database transaction is a position of a beginning record of the database transaction in the audit trail, and the high water mark for the database transaction is a position of an ending record of the database transaction in the audit trail.

4. The method of claim 3, wherein the determining of whether the transaction span of the database transaction exceeds the no rollback threshold comprises determining whether the low water mark for the database transaction is less than the no rollback threshold.

5. The method of claim 4, further comprising:
in response to determining that the low water mark for the database transaction is less than the no rollback threshold, converting, by the computing system, the database transaction into the no rollback transaction.

6. A computing system comprising:
a processor;
a data store for storing an audit trail of records of transactions; and
a non-transitory storage medium storing instructions executable on the processor to:
access a no rollback threshold for the audit trail;
determine whether a transaction span of a transaction exceeds the no rollback threshold for the audit trail, the no rollback threshold being preset to a percentage of a capacity of the audit trail;
in response to determining that the transaction span exceeds the no rollback threshold for the audit trail, convert the transaction to a no-rollback transaction, and abandon the no-rollback transaction responsive to encountering an error during the no-rollback transaction; and
in response to determining that the transaction span does not exceed the no rollback threshold for the audit trail, roll back the transaction responsive to encountering an error during the transaction.

7. The computing system of claim 6, wherein the no rollback threshold is user configurable.

8. The computing system of claim 6, wherein the transaction span is a range between a low water mark for the transaction and a high water mark for the transaction, wherein the low water mark for the transaction is a position of a beginning record of the transaction in the audit trail, and the high water mark for the transaction is a position of an ending record of the transaction in the audit trail.

9. The computing system of claim 8, wherein the instructions are executable on the processor to convert the transaction to the no-rollback transaction in response to the low water mark for the transaction being less than the no rollback threshold.

10. A non-transitory computer-readable storage medium comprising instructions that upon execution cause a system to:
determine whether a transaction span of a transaction exceeds a no rollback threshold for an audit trail that stores records for transactions, the no rollback threshold being preset to a percentage of a capacity of the audit trail;
roll back the transaction upon an occurrence of a processing error while processing the transaction in response to the transaction span of the transaction not exceeding the no rollback threshold; and
abandon the transaction upon an occurrence of a processing error while processing the transaction in response to the transaction span of the transaction exceeding the no rollback threshold.

11. The non-transitory computer-readable storage medium of claim 10, wherein the instructions upon execution cause the system to:
define the no rollback threshold as the percentage of the capacity of the audit trail.

12. The non-transitory computer-readable storage medium of claim 10, wherein the instructions upon execution cause the system to receive a user configuration of the no rollback threshold.

13. The non-transitory computer-readable storage medium of claim 10, wherein the transaction span is a range between a low water mark for the transaction and a high water mark for the transaction, wherein the low water mark for the transaction is a position of a beginning record of the transaction in the audit trail, and the high water mark for the transaction is a position of an ending record of the transaction in the audit trail.

14. The method of claim 1, wherein the percentage of the capacity of the audit trail is expressed as a fraction of a storage space of the audit trail, and wherein the determining that the transaction span exceeds the no rollback threshold comprises determining that a length of the database transaction exceeds the fraction of the storage space of the audit trail, and wherein the converting and the abandoning are performed in response to determining that the length of the database transaction exceeds the fraction of the storage space of the audit trail.

15. The method of claim 1, wherein the capacity of the audit trail is a storage space of the audit trail, and wherein the determining that the transaction span exceeds the no rollback threshold comprises determining that a length of the database transaction exceeds the no rollback threshold, and wherein the converting and the abandoning are performed in response to determining that the length of the database transaction exceeds the no rollback threshold.

16. The method of claim 15, wherein the length of the database transaction is expressed as an amount of space consumed by records of the database transaction if stored in the audit trail.

17. The computing system of claim 6, wherein the capacity of the audit trail is a storage space of the audit trail, and wherein the determining that the transaction span exceeds the no rollback threshold comprises determining that a length of the transaction exceeds the no rollback threshold, and wherein the converting and the abandoning are performed in response to determining that the length of the transaction exceeds the no rollback threshold.

18. The computing system of claim 17, wherein the length of the transaction is expressed as an amount of space consumed by records of the transaction if stored in the audit trail.

19. The non-transitory computer-readable storage medium of claim 10, wherein the capacity of the audit trail is a storage space of the audit trail, and wherein a determination that the transaction span exceeds the no rollback threshold comprises determining that a length of the transaction exceeds the no rollback threshold, and wherein the abandoning is performed in response to determining that the length of the transaction exceeds the no rollback threshold.

20. The non-transitory computer-readable storage medium of claim 19, wherein the length of the transaction is expressed as an amount of space consumed by records of the transaction if stored in the audit trail.

* * * * *